(12) United States Patent
Hon et al.

(10) Patent No.: US 8,919,798 B2
(45) Date of Patent: Dec. 30, 2014

(54) QUICKLY FOLDABLE BICYCLE

(75) Inventors: David Tak-Wei Hon, Shenzhen (CN); Xinxing He, Shenzhen (CN); Hanxin Zheng, Shenzhen (CN)

(73) Assignee: Dahon Technologies, Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/236,055

(22) PCT Filed: Apr. 9, 2012

(86) PCT No.: PCT/CN2012/073635
§ 371 (c)(1),
(2), (4) Date: Apr. 17, 2014

(87) PCT Pub. No.: WO2013/016957
PCT Pub. Date: Jul. 2, 2013

(65) Prior Publication Data
US 2014/0239611 A1    Aug. 28, 2014

(30) Foreign Application Priority Data

Aug. 1, 2011  (CN) ...................... 2011 2 0278542 U

(51) Int. Cl.
*B62K 15/00*  (2006.01)
(52) U.S. Cl.
CPC ............... *B62K 15/00* (2013.01); *B62K 15/008* (2013.01)
USPC ...................................................... 280/278
(58) Field of Classification Search
CPC ..... B62K 15/00; B62K 15/006; B62K 15/008
USPC .................................................. 280/278, 287
See application file for complete search history.

(56) References Cited

U.S. PATENT DOCUMENTS

| | | | | |
|---|---|---|---|---|
| 4,460,192 A | * | 7/1984 | Takamiya et al. | 280/287 |
| 5,330,219 A | * | 7/1994 | Groendal et al. | 280/275 |
| 6,032,971 A | * | 3/2000 | Herder | 280/278 |
| 2013/0228996 A1 | * | 9/2013 | Hon et al. | 280/287 |

FOREIGN PATENT DOCUMENTS

| | | |
|---|---|---|
| CN | 2619081 Y | 6/2004 |
| CN | 2656270 Y | 11/2004 |

(Continued)

OTHER PUBLICATIONS

Patent Cooperation Treaty: International Search Report for PCT/CN2012/073635; Guo, Xianjie; Jun. 28, 2012; 4 pages (including CN translation).

*Primary Examiner* — Kevin Hurley
(74) *Attorney, Agent, or Firm* — Howison & Arnott, LLP

(57) ABSTRACT

What is disclosed is a quickly foldable bicycle. A front arm and an intermediate arm are hinged together; the intermediate arm is fixed on the intermediate tube; a rear fork is hinged on the intermediate tube or on the intermediate arm; a seat tube is slidably sleeved inside the intermediate tube; a connecting rod seat is provided at a lower end of the seat tube; a first joint bearing at the front end of the front connecting rod is connected to a fixing seat at a lower side of the front arm; a second joint bearing at the rear end of the front connecting rod is connected to the connecting rod seat; and two ends of the rear connecting rod are hinged to the rear fork and the connecting rod seat respectively. The bicycle can be folded quickly, has a firm structure, is easy to produce and is eye-pleasing.

18 Claims, 4 Drawing Sheets

(56) References Cited

FOREIGN PATENT DOCUMENTS

| | | |
|---|---|---|
| CN | 201784765 U | 4/2011 |
| CN | 201834135 U | 5/2011 |
| CN | 202156506 U | 3/2012 |
| JP | 2000198482 A | 7/2000 |

* cited by examiner

QUICKLY FOLDABLE BICYCLE

CROSS-REFERENCE TO RELATED APPLICATIONS

This application is a U.S. National Phase application submitted under 35 U.S.C. §371 of Patent Cooperation Treaty application serial no. PCT/CN2012/073635, filed Apr. 9, 2012, and entitled QUICKLY FOLDABLE BICYCLE, which application claims priority to Chinese patent application serial no. 201120278542.7, filed Aug. 1, 2011, and entitled 快速折叠自行车

Patent Cooperation Treaty application serial no. PCT/CN2012/073635, published as WO 2013/016957, and Chinese patent application serial no. 201120278542.7, are incorporated herein by reference.

TECHNICAL FIELD

The present invention relates to a bicycle, and more particularly, to a quickly and longitudinally foldable bicycle.

BACKGROUND

Nowadays, the gross of the global energy is decreasing day by day. Due to the rise of the oil price, the public are tending to go green with environment-friendly vehicles. The bicycle is one of the best choices, because it is green, environment-friendly and helps build the body. The foldable bicycle is very popular at present and there are various styles of foldable bicycles on sale.

For example, Chinese Patent Application No. CN200320131888.X, now Chinese Patent No. CN2656270, issued on Nov. 17, 2004, discloses a quickly foldable bicycle which can be longitudinally folded. As shown in FIG. 1 of the Chinese patent (which is not provided herein), the bicycle comprises a front arm 1, an intermediate arm 2 and a rear arm 3. The front arm 1 and the intermediate arm 2 are hinged together through a joint 12. The intermediate arm 2 and the rear arm 3 are hinged together through another joint 13. The lower end of the seat supporting pole 5 is connected with the connecting rod 7 and the connecting rod 8 respectively through a universal joint 9. The connecting rod 8 is connected with the rear arm 3 through a universal joint 11, and the connecting rod 7 is connected with the front arm 1 through a universal joint 10. The seat supporting pole 5 is slidably inserted inside the tube 4. The tube 4 is fixed on the intermediate arm 2. Thereby, a three-dimensional, intersectional and transformable pentagon is formed. An intermediate shaft is provided in front of the tube 4. As the two connecting rods both connect at two ends with the corresponding adjacent components through universal joints, the seat tube has the problem of swinging transversely from left to right, which makes the bicycle insecure and causes certain danger when a rider is riding the bicycle. What's more, the front end of the connecting rod 7 is provided at one side of the front arm 1, presenting a protruding component, which will give rise to insecure factors such as scraping, bumping and so on, and it is not very aesthetic either.

Chinese Patent Application No. CN201020515083.5, now Chinese Patent No. CN201784765, issued on Apr. 6, 2011, discloses a figure therein having a longitudinally foldable bicycle, wherein the front end of the front connecting rod 7 is also provided at one side of the front arm 1, presenting a protruding hinge shaft 10 at the connection. The protruding hinge shaft brings the risk of scraping or bumping the legs of the rider.

SUMMARY

The present invention aims at providing a quickly and longitudinally foldable bicycle, which can be folded quickly, has a firm structure, is easy to produce, and is eye-pleasing.

The object of the present invention is achieved by the following technical scheme: a quickly foldable bicycle, wherein: a front arm and an intermediate arm are hinged together; the intermediate arm is fixed on the intermediate tube; a rear fork is hinged on the intermediate tube or on the intermediate arm; a seat tube is slidably sleeved inside the intermediate tube; a connecting rod seat is provided at a lower end of the seat tube; a first joint bearing at a front end of the front connecting rod is connected to a fixing seat at a lower side of the front arm; a second joint bearing at a rear end of the front connecting rod is connected to the connecting rod seat; and two ends of the rear connecting rod are hinged to the rear fork and the connecting rod seat respectively.

In various embodiments, the fixing seat has one side wall; and the first joint bearing at the front end of the front connecting rod is connected to the side wall and is rotatablely disposed relative to the fixing seat.

In various embodiments, the fixing seat has two side walls; and the first joint bearing at the front end of the front connecting rod is confined between the two side walls and is rotatablely disposed relative to the fixing seat.

In various embodiments, the connecting rod seat is a tightening ring with a gap; the front end of the connecting rod seat is provided with two side walls, and the second joint bearing at the rear end of the front connecting rod is confined inside the two side walls and is rotatablely disposed relative to the connecting rod seat.

In various embodiments, horizontal projection of the axis of the hinge shaft between the front arm and the intermediate arm and horizontal projection of the axis of the rear wheel form a certain angle.

In various embodiments, the front connecting rod is arc-shaped; and an intermediate part of the front connecting rod arches towards inclined top.

In various embodiments, a locking device is provided at an upper side of a connection between the front arm and the intermediate arm.

In various embodiments, sliding sleeves are provided inside two ends of the intermediate tube and between the intermediate tube and the seat tube.

In various embodiments, a supporting washer is provided at a bottom end of the seat tube.

In various embodiments, the connecting rod seat has two projecting lugs; a gap is formed between the two projecting lugs; both projecting lugs of the connecting rod seat have a through screw hole respectively; and two through screw holes are opposite to each other.

According to an embodiment, the front connecting rod of the quickly foldable bicycle is disposed right under the frame, and the front end of the front connecting rod is connected to the lower side of the front arm without protruding from the left side and the right side of the front arm, which will not give rise to scraping or bumping the legs of a rider and make the bicycle much safer and more reliable. What is more, when the rider is seated on the saddle, the connecting rods will be hidden under the frame, thus the connecting rods will not bring about visual disturbance, and the bicycle is more eye-pleasing. Additionally, the front connecting rod is arc-shaped; and it can avoid the front arm when the frame is folded, so that the volume of the folded frame can become minimum which is suitable for storage and transportation. Furthermore, the joint bearings at the front end and the rear end of the front connecting rod are fixed both through two-side connection, which makes the bicycle safer and more stable. The two-side connection herein refers to that the joint bearing is confined inside a structure with two side walls.

DETAILED DESCRIPTION

Embodiments of the quickly foldable bicycle in accordance with the present invention will be further described in conjunction with the accompanying drawings.

Figure 1:
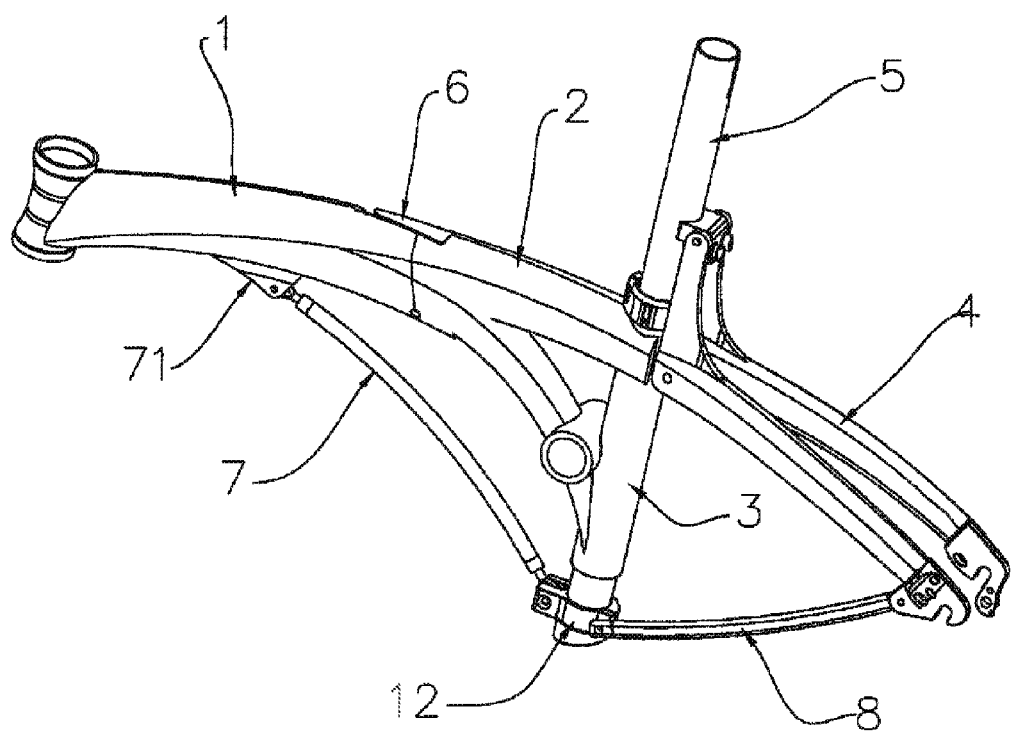
FIG. 1 is a stereogram illustrating the quickly foldable bicycle when it is in use.
Figure 2:
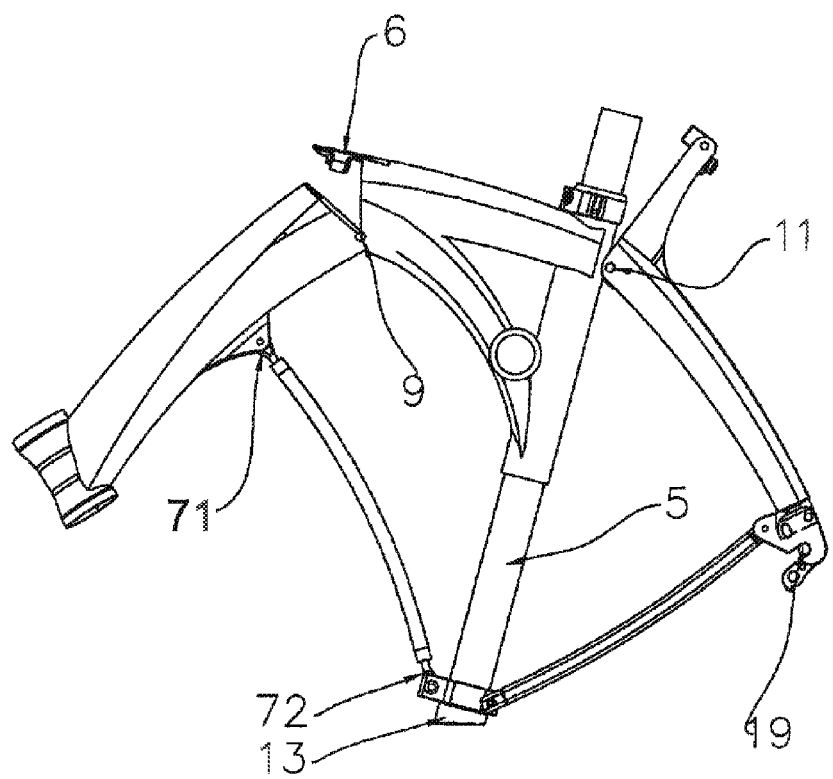
FIG. 2 is a schematic view illustrating the quickly foldable bicycle when it is folded halfway.
Figure 3:
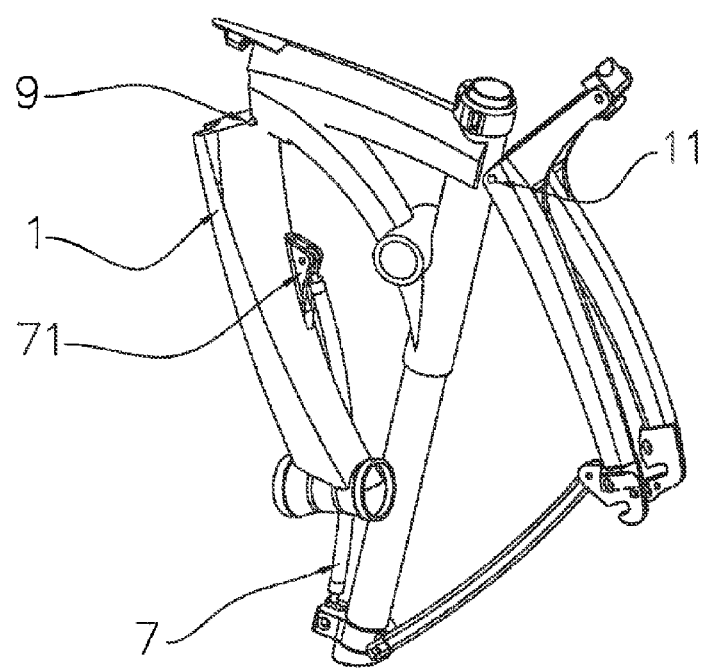
FIG. 3 is a schematic view illustrating the quickly foldable bicycle when it is folded completely.

As shown in FIGS. 1-3, what is mainly disclosed in the embodiments is the frame of the foldable bicycle. The front wheel, the rear wheel, the bicycle saddle, and so on, are known from the prior art and common knowledge by those skilled in the art, so they will not be described here.

The quickly foldable bicycle includes a front arm 1, an intermediate arm 2, an intermediate tube 3, a rear fork 4, a seat tube 5, a locking device 6, a front connecting rod 7 and a rear connecting rod 8.

The front arm 1 and the intermediate arm 2 are hinged together through a hinge shaft 9 which is provided at the lower side of the connection between the front arm 1 and the intermediate arm 2, and the locking device 6 is provided at the upper side of the connection between the front arm 1 and the intermediate arm 2. During cycling, the front arm 1 and the intermediate arm 2 are locked by the locking device 6. And in the folded state, the locking device 6 is unlocked. Of course, the locking device 6 is not indispensable. According to mechanical principles, during cycling, the front arm 1 and the intermediate arm 2 are hinged together at the lower side, and the front wheel and the rear wheel are respectively subjected to upward forces from the road surface, as a result, pressing forces will act on the connection between the front arm 1 and the intermediate arm 2. The locking device 6 is disposed for enhancing the safety of the bicycle in cycling. For example, the locking device 6 is a handle which buckles the front arm 1 and the intermediate arm 2 together. The handle is hinged on the intermediate arm, and a detent is provided on the front arm for locking the handle. Alternatively, the locking device 6 is a four-bar mechanism, which is disclosed in Chinese Patent Application No. CN02225922.8, now Chinese Patent No. CN2619081, issued on Jun. 2, 2004, and will not be described here.

The intermediate tube 3 and the rear fork 4 are hinged together through the hinge shaft 11. The intermediate tube 3 is sleeved on the seat tube 5, and the lower end of the seat tube 5 extends out of the lower end of the intermediate tube 3. A connecting rod seat 12 is provided at the lower end of the seat tube 5. The front end and the rear end of the front connecting rod 7 are respectively provided with a joint bearing 72. A fixing seat 71 is provided at the lower side of the front arm 1. The joint bearing 72 at the front end of the front connecting rod 7 is connected to the fixing seat 71 and is rotatably disposed relative to the fixing seat 71. The fixing seat 71 has two side walls and the joint bearing 72 at the front end is confined between the two side walls. Alternatively, the fixing seat 71 has one side wall connected to the front connecting rod 7, but the strength and the stability of the limitation through one-side connection is worse than those of the limitation through two-side connection.

Figure 4:
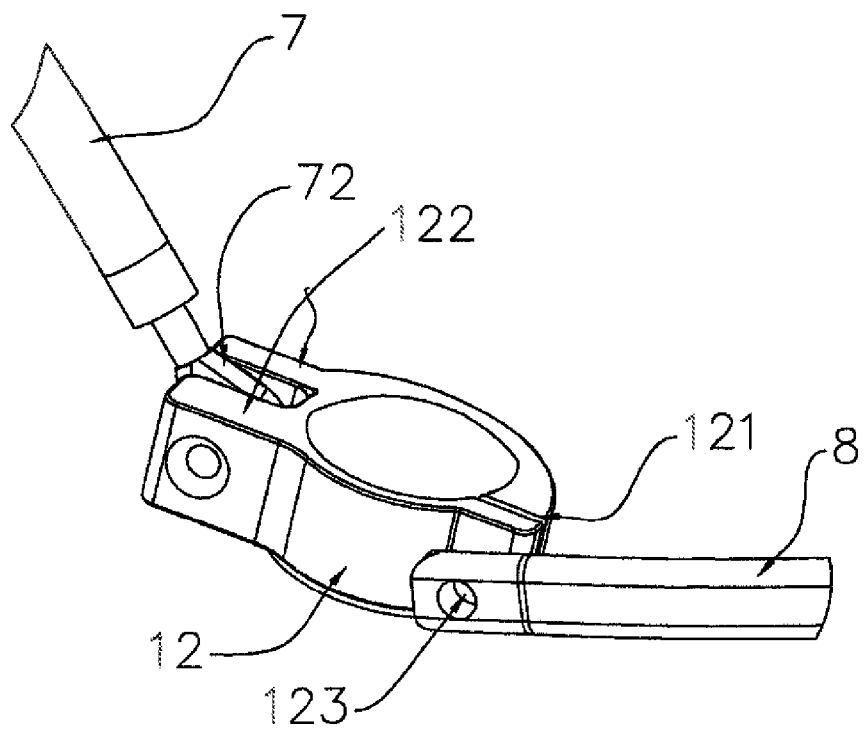
FIG. 4 is a schematic view illustrating the connecting rod seat of the quickly foldable bicycle.

As shown in FIG. 4, the connecting rod seat 12 is a tightening ring with a gap 121; the front end of the connecting rod seat 12 is provided with two side walls 122, and the joint bearing 72 at the rear end of the front connecting rod 7 is confined between the two side walls 122 and is rotatably disposed relative to the connecting rod seat 12. The connecting rod seat 12 has two projecting lugs; the gap 121 is formed between the two projecting lugs; both projecting lugs have a through screw hole respectively. The connecting rod seat 12 is locked at the lower end of the seat tube 5 with a bolt going through the through screw holes in the projecting lugs, and one end of the rear connecting rod 8 is hinged to the connecting rod seat 12 also through the bolt. Namely, the connecting rod seat 12 and the rear connecting rod 8 are hinged together through a bolt going through a through hole 123 at the end of the rear connecting rod 8 and the through screw holes provided in the projecting lugs of the connecting rod seat 12. The other end of the rear connecting rod 8 is hinged to the rear end of the rear fork 4. Alternatively, the connecting rod seat 12 is connected with the joint bearing 72 through only one side wall, but the strength and the stability of the limitation through one-side connection is worse than those of the limitation through two-side connection.

The intermediate tube 3 is sleeved on the seat tube 5, and the seat tube 5 can slide in the intermediate tube 3 in an axial direction. The intermediate tube 3 is fixed on the intermediate arm 2. The front arm 1, the intermediate arm 2, the rear fork 4, the front connecting rod 7 and the rear connecting rod 8 jointly form a three-dimensional, intersectional and transformable pentagon in FIG. 2 when an embodiment is halfway folded.

Sliding sleeves (not specifically shown) are provided inside two ends of the intermediate tube 3 and between the intermediate tube 3 and the seat tube 5. For example, one sliding sleeve is sleeved inside the upper end of the seat tube, and another sliding sleeve is sleeved inside the lower end of the seat tube, so that the intermediate tube 3 can slide smoothly relative to the seat tube 5 when the bicycle is being folded or unfolded.

The bottom end of the seat tube is provided with a supporting washer 13. When the bicycle is folded, the supporting washer 13 is propped against the ground to protect the bottom end of the seat tube from wearing.

The hinge shaft 9 is inclined transversely. When it is in use, the bicycle can be folded simply by raising the intermediate tube 3, and the bicycle can be unfolded to the use state simply by lowering down the intermediate tube 3, which is very convenient for folding or unfolding the bicycle.

Figure 5:
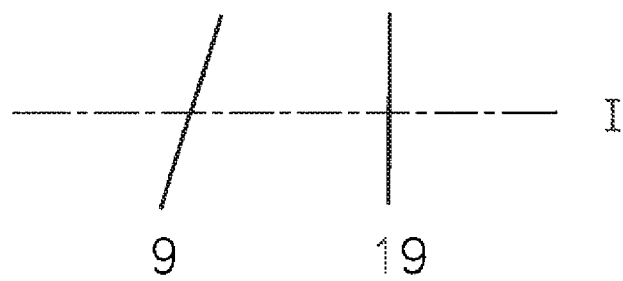
FIG. 5 is a schematic view illustrating the angle relationship between the hinge shaft and the rear wheel of the quickly foldable bicycle.

As shown in FIG. 5, axis I is the fore-and-aft axis of the bicycle, namely, the longitudinal axis. The axis 19 of the rear wheel is perpendicular to the axis I, but the axis of the hinge shaft 9 is not perpendicular to the axis I. The axis of the hinge shaft 9 and the axis 19 of the rear wheel form a certain angle so that the front wheel and the rear wheel can be staggered when the bicycle is folded longitudinally.

Another remarkable characteristic of the embodiment is that the front connecting rod 7 is arc-shaped. As shown in FIG. 1, the intermediate part of the front connecting rod 7 arches towards right and top so as to match with the streamlined frame on one hand, and not to interfere with the front arm 1 of the bicycle on the other hand. As shown in FIG. 3, the arc-shaped front connecting rod 7 is positioned to just avoid the front arm 1, so that the volume of the folded frame can become minimum which is suitable for storage and transportation. The specific flexing angle of the front connecting rod 7 is determined by factors such as dimension and angle of the front arm 1, and so on.

The preferred embodiments described above are not restricted. It will be understood that various amendments, equivalent changes and improvements may be made based on the spirit and principle of the present invention without departing from the scope of the invention.

What is claimed is:

1. A foldable bicycle frame comprising:
    a front arm;
    an intermediate arm having a front end pivotally attached to a rear end the front arm such that the front arm can pivot about a hinge shaft positioned proximate to a lower side of the rear end of the front arm;
    an intermediate tube affixed to the intermediate arm;
    a rear fork pivotally attached to the intermediate tube;
    a seat tube slidably sleeved inside the intermediate tube, a lower end of the seat tube extending out of a lower end of the intermediate tube;
    a connecting rod seat positioned proximate to the lower end of the seat tube, the connecting rod seat comprises a first sidewall extending toward the front of the bicycle frame and two lugs extending toward the rear of the bicycle frame;
    a front connecting rod comprising:
        a first joint bearing at the front end of the front connecting rod, the first joint bearing being rotatably attached to a fixing seat located on a lower side of the front arm; and
        a second joint bearing at the rear end of the front connecting rod, the second joint bearing being rotatably attached to the first sidewall on the connecting rod seat;
    a rear connecting rod comprising:
        a front joint bearing at the front end of the rear connecting rod, the front joint bearing being rotatably attached to at least one of the two projecting lugs on the connecting rod seat; and
        a rear joint bearing at the rear end of the rear connecting rod, the rear joint bearing being rotatably attached proximate to a rear end of the rear fork.

2. The foldable bicycle frame according to claim 1, wherein the fixing seat comprises one side wall extending from the lower side of the front arm; and wherein the first joint bearing is attached to the side wall and is rotatablely disposed relative to the fixing seat.

3. The foldable bicycle frame according to claim 1, wherein the fixing seat comprises two side walls extending from the lower side of the front arm; and wherein the first joint bearing is attached to the fixing seat between the two side walls and rotatablely disposed relative to the fixing seat.

4. The foldable bicycle frame according to claim 1, wherein the connecting rod seat further comprises a tightening ring with a gap, the tightening ring encircling an outer perimeter of the seat tube; the connecting rod seat further comprising a second sidewall extending toward the front of the bicycle frame and substantially parallel with the first side wall; wherein the second joint bearing is rotatably attached between the first and second side walls of the connecting rod seat.

5. The foldable bicycle frame according to claim 1, wherein a horizontal projection of the axis of the hinge shaft and a horizontal projection of an axis of a rear wheel form a certain angle at their intersection.

6. The foldable bicycle frame according to claim 1, wherein the front connecting rod is arc-shaped such that an intermediate part of the front connecting rod arches generally upwards.

7. The foldable bicycle frame according to claim 1, further comprising a locking device on an upper side the front arm and intermediate arm, the locking device configured to secure the foldable bicycle frame in a rideable state when locked and allow the foldable bicycle frame to be configured into a folded state when unlocked.

8. The foldable bicycle frame according to claim 1, further comprising a sliding sleeve inside the intermediate tube and between the intermediate tube and the seat tube.

9. The foldable bicycle frame according to claim 1, further comprising a supporting washer at a bottom end of the seat tube, the supporting washer is configured to minimize wear to the bottom of the seat tube.

10. The foldable bicycle frame of claim 1, wherein the connecting rod seat further comprises:
    a tightening ring with a gap, the tightening ring encircling an outer perimeter of the seat tube and the gap being between the two lugs;
    a bolt extending through a through hole in the front joint bearing and screw holes in the two lugs.

11. A foldable bicycle comprising:
    a front arm;
    an intermediate arm having a front end of the intermediate arm that is pivotally attached to a rear end of the front arm such that the front arm can pivot about a hinge shaft positioned proximate to a lower side of the rear end of the front arm, the rear end of the front arm abutting the front end of the intermediate arm when the foldable bicycle is in a rideable state;
    an intermediate tube affixed to the intermediate arm;
    a rear fork pivotally attached to the intermediate tube;
    a seat tube slidably sleeved inside the intermediate tube, a lower end of the seat tube extending out of a lower end of the intermediate tube, the intermediate tube adapted to move toward the lower end of the seat tube when the foldable bicycle is in the rideable state;
    a connecting rod seat positioned proximate to the lower end of the seat tube, the connecting rod seat comprises a first sidewall extending toward the front of the bicycle frame and two lugs extending toward the rear of the bicycle frame;
    a front connecting rod comprising:
        a first joint bearing at the front end of the front connecting rod, the first joint bearing being rotatably attached to a fixing seat located on a lower side of the front arm; and
        a second joint bearing at the rear end of the front connecting rod, the second joint bearing being rotatably attached to the first sidewall on the connecting rod seat;
    a rear connecting rod comprising:
        a front joint bearing at the front end of the rear connecting rod, the front joint bearing being rotatably attached to at least one of the two projecting lugs on the connecting rod seat; and
        a rear joint bearing at the rear end of the rear connecting rod, the rear joint bearing being rotatably attached proximate to a rear end of the rear fork.

12. The foldable bicycle according to claim 11, wherein the connecting rod seat further comprises a tightening ring with a gap, the tightening ring encircling an outer perimeter of the seat tube; the connecting rod seat further comprising a second sidewall extending toward the front of the bicycle frame and substantially parallel with the first side wall; wherein the second joint bearing is rotatably attached between the first and second side walls of the connecting rod seat.

13. The foldable bicycle according to claim 11, wherein the fixing seat comprises one side wall extending from the lower side of the front arm; and wherein the first joint bearing is attached to the side wall and is rotatablely disposed relative to the fixing seat.

14. The foldable bicycle according to claim 11, wherein the fixing seat comprises two side walls extending from the lower side of the front arm; and wherein the first joint bearing is attached to the fixing seat between the two side walls and rotatablely disposed relative to the fixing seat.

15. The foldable bicycle according to claim 11, wherein a horizontal projection of the axis of the hinge shaft and a horizontal projection of an axis of a rear wheel form a certain angle at their intersection such that when the foldable bicycle is in a folded position, a front wheel and a rear wheel are placed in a staggered position.

16. The foldable bicycle according to claim 11, wherein the front connecting rod is arc-shaped such that an intermediate section of the front connecting rod arches generally upwards.

17. The foldable bicycle according to claim 11, wherein the front connecting rod is arc-shaped such that when the foldable bicycle is in a folded position the front connecting rod does not interfere with the front arm.

18. The foldable bicycle frame according to claim 11, further comprising a locking device on an upper side the front arm and intermediate arm, the locking device configured to secure the foldable bicycle frame in the rideable state when locked and allow the foldable bicycle frame to be configured into a folded state when unlocked.

* * * * *